United States Patent
Chiu et al.

(10) Patent No.: US 12,358,244 B2
(45) Date of Patent: Jul. 15, 2025

(54) CASTING A LENS WITH SURFACE MICROSTRUCTURES

(71) Applicant: Essilor International, Charenton-le-Pont (FR)

(72) Inventors: Hao-Wen Chiu, Holden, MA (US); Aref Jallouli, Shrewsbury, MA (US)

(73) Assignee: Essilor International, Charenton-le-Pont (FR)

( * ) Notice: Subject to any disclaimer, the term of this patent is extended or adjusted under 35 U.S.C. 154(b) by 169 days.

(21) Appl. No.: 17/918,446

(22) PCT Filed: Apr. 14, 2021

(86) PCT No.: PCT/EP2021/059649
§ 371 (c)(1),
(2) Date: Oct. 12, 2022

(87) PCT Pub. No.: WO2021/209497
PCT Pub. Date: Oct. 21, 2021

(65) Prior Publication Data
US 2023/0136033 A1    May 4, 2023

(30) Foreign Application Priority Data
Apr. 14, 2020 (EP) .................... 20315163

(51) Int. Cl.
*B29C 39/02* (2006.01)
*B29D 11/00* (2006.01)

(52) U.S. Cl.
CPC .. *B29D 11/00326* (2013.01); *B29D 11/00528* (2013.01); *B29D 11/00865* (2013.01)

(58) Field of Classification Search
CPC ........ B29D 11/03926; B29D 11/00528; B29D 11/00865
USPC .......................................... 264/1.1
See application file for complete search history.

(56) References Cited

U.S. PATENT DOCUMENTS

| 9,242,418 B2 * | 1/2016 | Shan ................. B29D 11/0048 |
| 2012/0327364 A1 * | 12/2012 | Valeri ................. C08G 59/38 523/435 |
| 2017/0131567 A1 | 5/2017 | To et al. |
| 2019/0324293 A1 | 10/2019 | Marshall et al. |
| 2020/0012123 A1 | 1/2020 | Newman |

FOREIGN PATENT DOCUMENTS

| WO | WO 1989/011966 | 12/1989 |
| WO | WO 2019/124353 | 6/2019 |

OTHER PUBLICATIONS

International Search Report and Written Opinion issued in Corresponding PCT Application No. PCT/EP2021/059649, dated Jul. 15, 2021.

* cited by examiner

*Primary Examiner* — Christina A Johnson
*Assistant Examiner* — Xue H Liu
(74) *Attorney, Agent, or Firm* — Norton Rose Fulbright US LLP

(57) ABSTRACT

A mold element (350) is fabricated (305, 310, 315) using a first mold (5) with which microstructures (323) are integrally formed in relief on the mold element (350). A lens (340) is cast (320, 325, 330, 335) using a second mold (7) that includes the mold element (350) such that the microstructures (337) are integrally formed on the lens (340).

10 Claims, 5 Drawing Sheets

CASTING A LENS WITH SURFACE MICROSTRUCTURES

CROSS-REFERENCE TO RELATED APPLICATIONS

This application is a national phase application under 35 U.S.C. § 371 of International Application No. PCT/EP2021/059649 filed 14 Apr. 2021, which claims priority to European Patent Application No. 20315163.4 filed 14 Apr. 2020. The entire contents of each of the above-referenced disclosures is specifically incorporated by reference herein without disclaimer.

BACKGROUND

Technical Field

The present disclosure is directed to casting thermoset lenses having microstructures on the surfaces. More specifically, instead of using typical glass or metal molds, plastic molds having microstructures on the surfaces are proposed for casting lenses. Optionally, the plastic molds can be precoated with a reversed hard multi-coat (HMC) stack to produce HMC coated thermoset lenses with surface microstructures.

Related Art

Myopia is a prevalent ocular disorder; approximately 23% (1.4 billion people) worldwide were nearsighted in 2000 and 50% of the global population (4.8 billion people) will become myopic by 2050 according to Brien Holden Vision Institute in Australia. High myopia increases the risk of sight-threatening problems, such as retinal detachment, cataracts, and glaucoma. Hence, it is very important to slow the progression of myopia in children. Several studies conducted in recent years have shown that using microlenses on the front surface (convex surface) of a regular single vision (SV) lens to introduce myopic defocus in the periphery is very effective in slowing myopia progression.

Casting thermoset lenses with surface microlenses (or other microstructures such as Fresnel), molds with microlenses either on the concave surface or the convex are required. However, making glass molds with precise microlenses on the surface is not yet technically feasible even with micromachining. Moreover, nickel molds either by direct micromachining or from replication of a master are very expensive, especially when considering the larger number of molds required for a casting operation. Therefore, a cost effective solution for making casting molds with surface microlenses and/or other microstructures is extremely important to produce thermoset lenses with surface microlenses at a reasonable cost to make them widely accessible, especially to the needy, to help conquer the myopia epidemic.

SUMMARY

A method according to the disclosure comprises:
fabricating a thermoplastic mold element by thermoplastic injection molding, using a first mold with which microstructures are integrally formed in relief on the thermoplastic mold element; and
casting a lens by a thermoset casting technique, using a second mold that includes the thermoplastic mold element such that a microstructure pattern is integrally formed on the lens, wherein the microstructures on the thermoplastic mold element are in relief with respect to the microstructure pattern on the lens.

The cast thermoset lens may generally be a spectacle ophthalmic lens.

DETAILED DESCRIPTION

Figure 1:
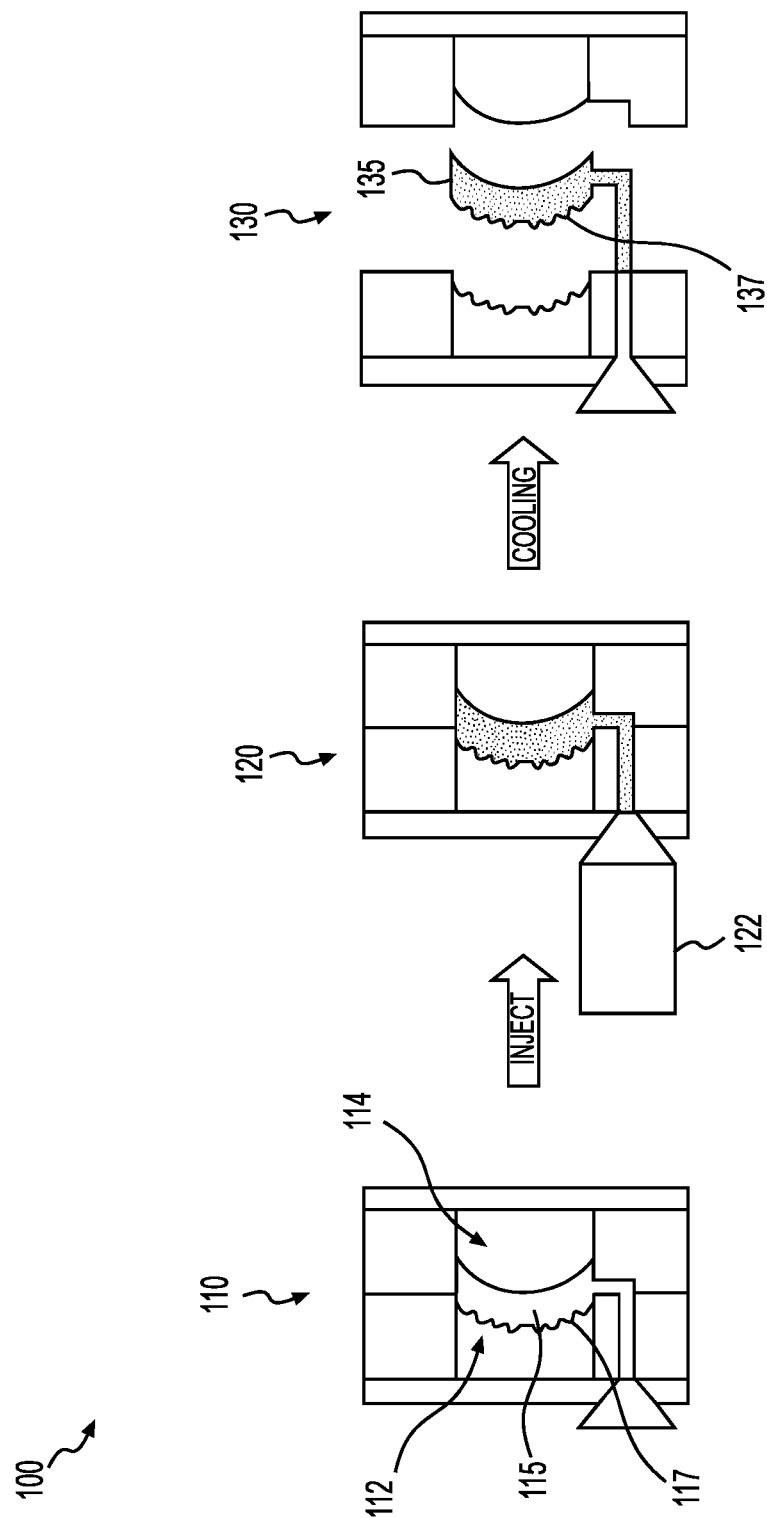
FIG. 1 is a schematic block diagram of a thermoplastic injection molding process that can be used in conjunction with embodiments of the present concept.

The present disclosure is best described through certain embodiments thereof, which are described in detail herein with reference to the accompanying drawings, wherein like reference numerals refer to like features throughout. It is to be understood that the term disclosure, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 is a schematic block diagram of a typical thermoplastic injection molding process 100. In operation 110, a mold cavity 115 is formed between a concave (CV) mold insert 112 with concave microlenses, representatively illustrated at microlens 117 and representatively referred to herein as microlens(es) 117, disposed on its concave surface, and a smooth convex (CX) insert 114. Each microlens 117 may be configured with particular optical properties, e.g., focal length, numerical aperture, etc. In operation 120, molten thermoplastic (e.g., polycarbonate (PC), poly(methyl methacrylate) (PMMA), and polyamide (PA, a.k.a. Nylon)) is injected into chamber 115. The mold may be cooled and after a cooling period, process 100 may transition to operation 130, whereby a SV lens 135 with microlenses 137 disposed on its convex surface may be ejected or otherwise released from the mold.

Typically, CV insert 112 is a steel insert with nickel phosphorus (NiP) plating. The concave microlenses 117 are created in the insert by micromachining the NiP. Such approach has been demonstrated to successfully produce SV PC lenses with microlenses on the CX surface, such as SV lens 135 having microlenses 137 disposed thereon, with good quality.

Figure 2:
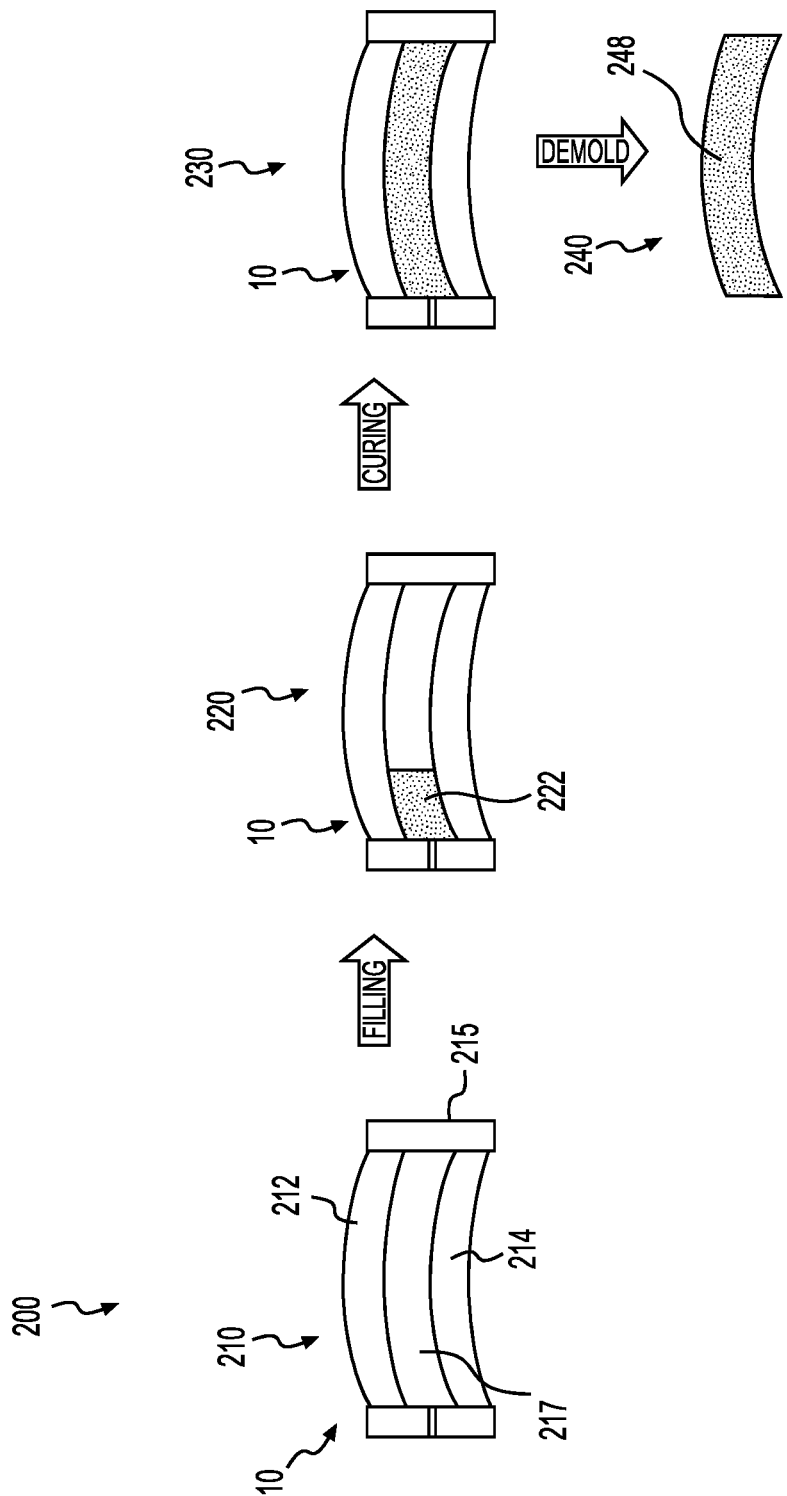
FIG. 2 is a schematic block diagram of a thermoset casting process of a lens that can be used in conjunction with embodiments of the present concept.

FIG. 2 is a schematic block diagram of a thermoset casting process 200 of a lens. Casting thermoset lenses with surface microstructures like microlenses remains very challenging. One difficulty lies in the absence of a cost effective solution for making casting molds with concave microlenses on the surface (the convex microlenses in relief). As illustrated in FIG. 2, thermoset lens casting process 200 uses a mold 10 comprising two mold elements 212 and 214 sealed with a gasket 215 or other sealing mechanism, such as a tape. In operation 210, a cavity 217 is formed by way of gasket 215 retaining the two mold elements 212 and 214 in separation one from the other. In operation 220, the cavity 217 of mold 10 is filled with a monomer 222. After filling, process 200 transitions to operation 230, whereby the entire mold 10 is placed in an oven to thermally cure the monomer for several hours. In operation 240, the resulting lens 248 is demolded from mold 10.

Unlike the continuous injection molding process 100, thermoset lens casting process 200, especially the curing step, is a very lengthy batch process and requires simultaneous processing of many mold assemblies to meet volume demand and cost target. Hence, the number of molds required for a thermoset lens casting operation is tremendous. Typically, glass and/or nickel replicates are used to build the casting molds. Due to the high costs, the molds have to be cleaned and reused, which requires a very extensive mold cleaning operation.

A cost effective solution for making casting molds with surface microlenses and/or other microstructures is needed. Embodiments of the inventive concept produce casting mold elements by injection molding. As described above, SV PC lenses with microlenses on the CX surface can be successfully produced by injection molding. It is thus an idea of present disclosure to use PC (or other thermoplastics) lenses as mold elements with surface microlenses (or other microstructures) for casting thermoset lenses.

Figure 3:
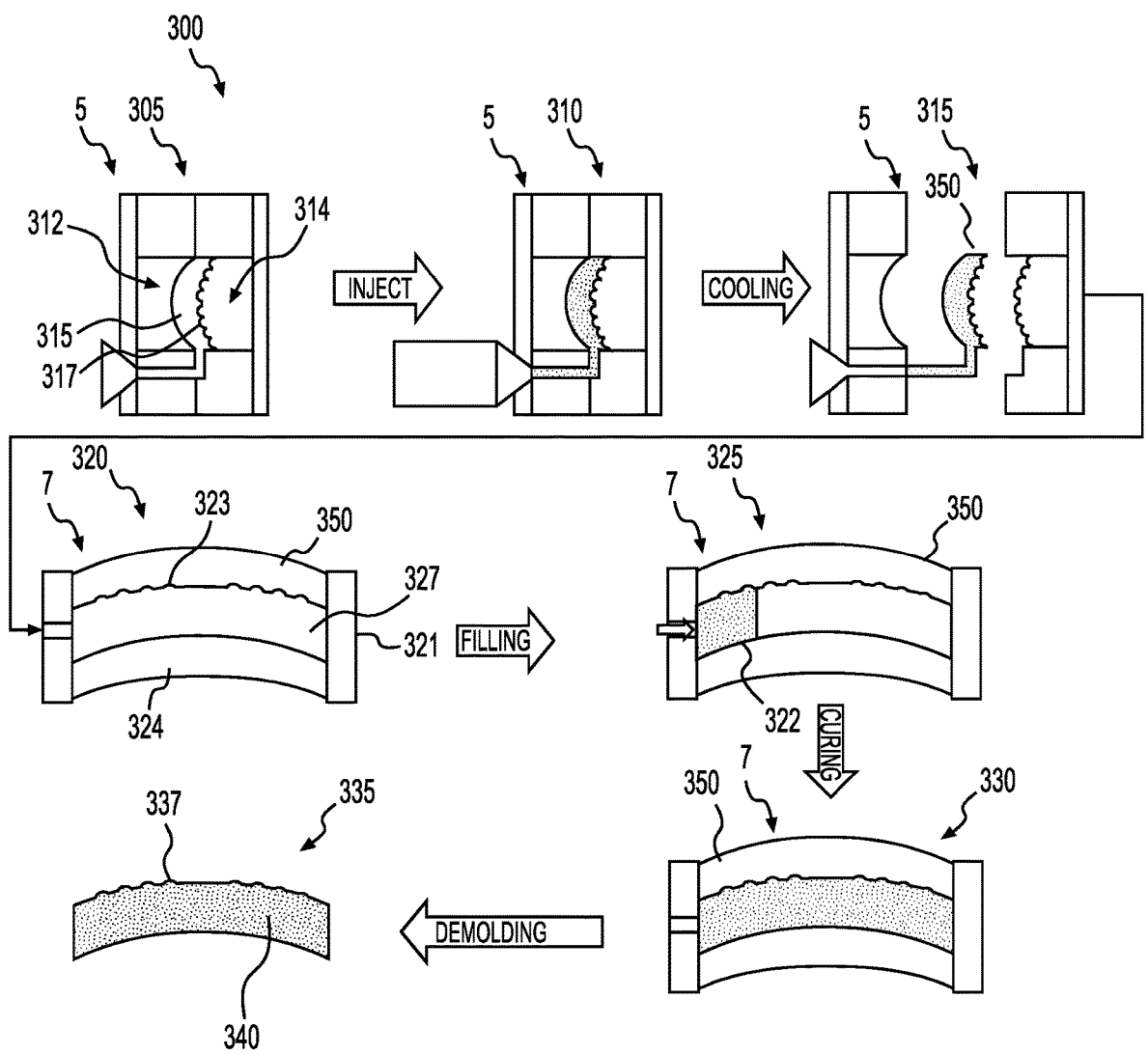
FIG. 3 is a schematic block diagram of an example lens casting process by which the present embodiments can be realized.

FIG. 3 is a schematic block diagram of an example lens casting process 300 by which the present disclosure can be embodied. Operations 305, 310 and 315 may be performed analogously to operations 110, 120 and 130, respectively, described with reference to FIG. 1. Particularly, a first mold 5 comprising a CV insert 312 and a CX insert 314 forming a cavity 315 therebetween is filled with a thermoplastic, cooled and a lens 350 is ejected. However, in this case, lens 350 is a component of a second mold 7 that is used for casting the final thermoset lens 340, and will be referred to herein as mold element 350 of mold 7. It is to be noted that the microstructures formed on CX insert 314 are as they are to appear in the final lens 340, which means that the microstructures on mold element 350 are in relief with respect to how the microstructures are to be disposed on final lens 340.

Once mold element 350 has been fabricated, operations 320, 325, 330 and 335 of process 300 may be performed analogously to operations 210, 220, 230 and 240, respectively, described with reference to FIG. 2. Particularly, mold element 350 may paired with a second mold element 324, which may be fabricated by a process similar to that by which mold element 350 was fabricated. The mold pair 350 and 324 may be held in separation by a gasket 321 to form a chamber or cavity 327 therebetween. Cavity 327, which includes microstructure relief pattern 323, may be filled with a monomer 322, which is then cured and demolded into a lens 340 having a microstructure pattern formed on its CX surface.

Figure 4:
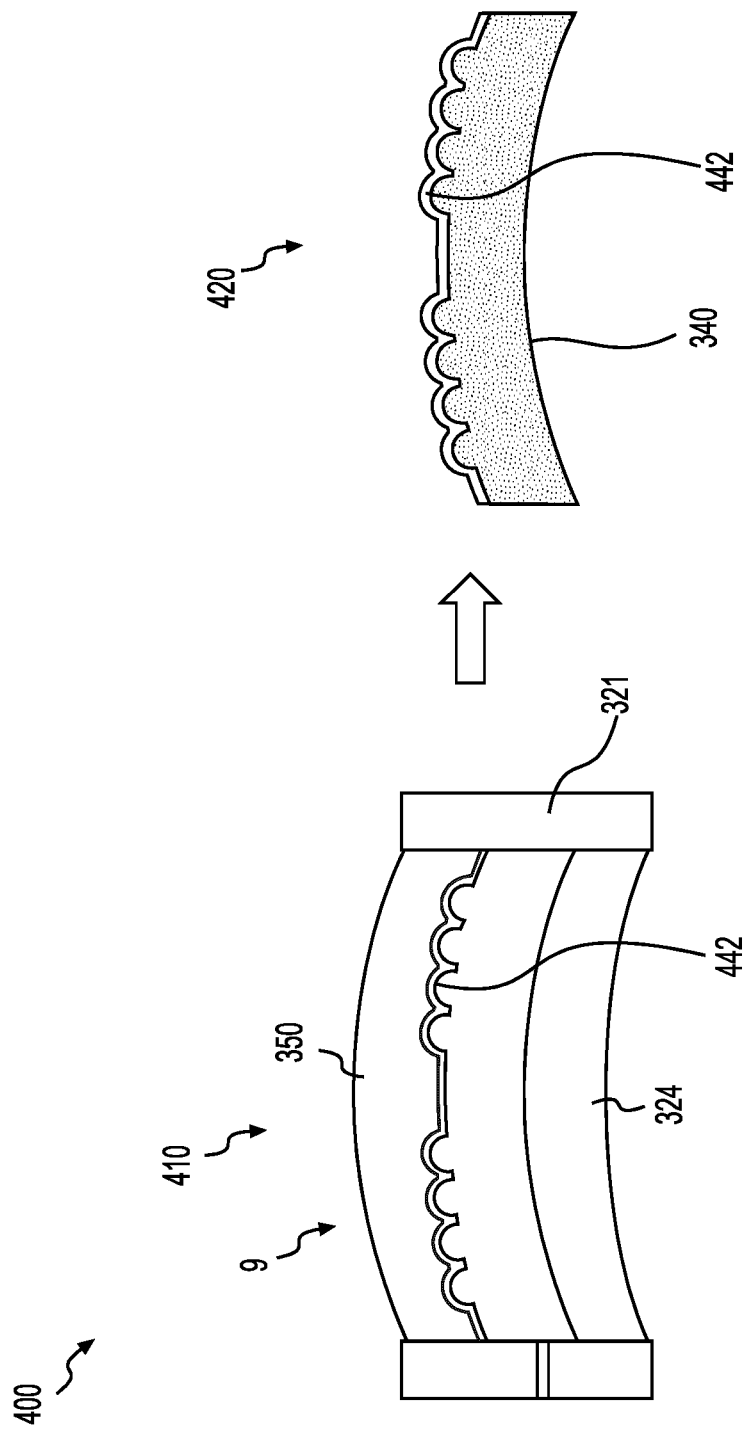
FIG. 4 is a schematic block diagram of an optional coating process that can be used in conjunction with the present embodiments.

FIG. 4 is a schematic block diagram of an optional coating process 400 that can be used in conjunction with the present disclosure. PC mold 9 may comprise the mold elements 350 and 324, and gasket 321 described above, where mold element 350 has surface microlenses in relief formed thereon. Additionally, in operation 410, a reversed hard multi-coat (HMC) stack 442 may be applied to mold 9, such that the HMC stack 442 is properly transferred to the resulting thermoset lens 340 in operation 420. An added benefit of such is the preservation of the microlens design, which would typically have been affected by the application of a hard coat.

Figure 5:
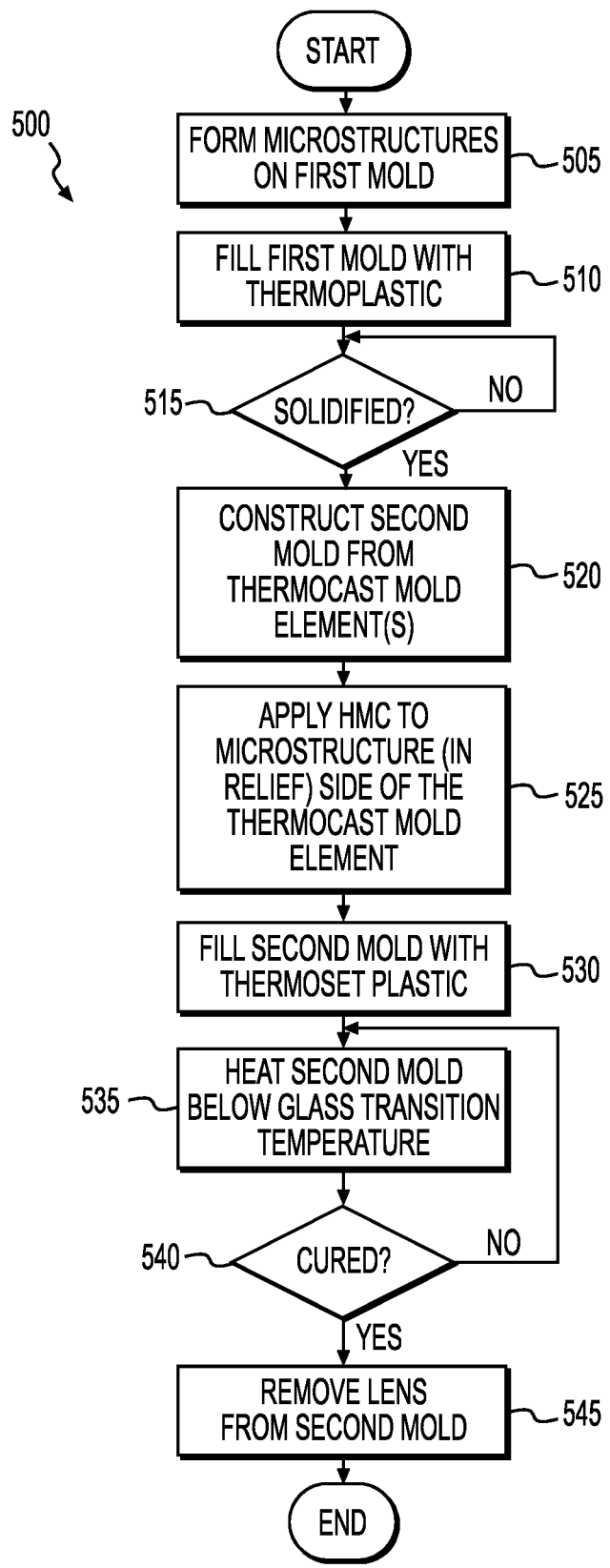
FIG. 5 is a flow diagram of an exemplary lens casting process by which the present embodiments can be realized.

FIG. 5 is a flow diagram of an exemplary lens casting process 500 by which the present concept can be embodied. In operation 505, microstructures are formed on a first mold and, in operation 510, the first mold is filled with a thermoplastic. In operation 515, it is determined whether the thermoplastic is solidified and, if so, process 500 may transition to operation 520, by which a second mold is constructed from the mold elements produced by the thermoplastic injection molding operation. In operation 525, HMC may be applied to the microstructure side of the thermoplastic mold element and, in operation 530, the second mold is filled with a thermoset monomer, e.g., one of the monomers described herein. In operation 535, the second mold is heated below the glass transition temperature, as discussed below. In operation 540, it is determined whether the thermoset plastic has sufficiently cured and, if so, the resulting lens with microstructures formed thereon may be removed from the second mold in operation 545.

Other variations of present disclosure may also be embodied. For example, one can put microstructures on the convex PC mold surface to produce a thermoset lens with microstructures on the concave surface. Or, one can have microstructures on both concave and convex PC molds to cast a thermoset lens with microstructures on both sides. Moreover, a reversed HMC stack can be applied to the convex PC mold as well to produce a lens with HMC on both sides, which is especially suitable for casting a finished lens.

Further, in addition to PC, many thermoplastic materials, either transparent or opaque, such as polyamide, polysulfone, polyester, polyetheretherketone (PEEK) can be used to produce the casting molds. When the mold material is transparent to UV, like many clear thermoplastics without UV absorbers (UVA) are, UV curable monomers may be used instead of or in addition to heat curable monomers to cast the lenses. The main restriction is that the glass transition temperature ($T_g$) of the mold material needs to be significantly above the curing temperature ($T_{curing}$) of the casting process to prevent mold distortion leading to bad optics of resulting lenses. It is preferred to have $T_g \geq T_{curing} + 20$ (° C.). One may also pay special attention to the thermal expansion of the mold material as such might lead to dimensional errors of the resulting thermoset lens, especially the surface microstructures. The thermal expansion of a thermoplastic is usually characterized by the "Coefficient of Linear Thermal Expansion (CTE)" per ISO 11359-2. It is preferred to have CTE$\leq$1E-4 (1/° C.) to avoid cast lens dimensional errors.

Although present disclosure has been described as using thermoplastic molds by injection molding for casting thermoset lenses, it is also possible to build a mold by direct micromachining of a plastic lens or block. Of course, such approach is not as cost effective as injection molding. It is still a lower cost solution than using nickel molds.

Examples of monomers that could be used in this disclosure include allylcarbonates, acrylics, isocyanates and thiols, episulfides, etc.

Finally, some advantages of present embodiments are: thermoset casting mold with surface microstructures can be mass produced by PC injection molding using NiP plated steel inserts; PC molds are significantly lower cost than nickel replicates, disposable, and can be recycled. It is possible to use UV curable in addition to heat curable monomers. Precoating the PC mold with HMC preserves the microlens design accuracy that prevents optical errors due to hard coating.

The flowchart and block diagrams in the figures illustrate the architecture, functionality, and operation of possible implementations of systems and methods according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the invention and the practical application, and to enable others of ordinary skill in the art to understand the disclosure for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the disclosure should therefore be determined not with reference to the description above, but with reference to the appended claims, along with their full range of equivalents.

The invention claimed is:

1. A method comprising:
  fabricating an upper thermoplastic mold element by thermoplastic injection molding, using a first mold with which microstructures are integrally formed in relief on the upper thermoplastic mold element; and
  casting a lens by a thermoset casting technique, in a second mold that comprises the upper thermoplastic mold element, a lower mold element, and a gasket or tape to retain the upper thermoplastic mold element separated from the lower mold element, wherein the upper thermoplastic mold element, lower mold element, and gasket or tape form a chamber into which a monomer is filled and cured through thermosetting such that a microstructure pattern is integrally formed on the lens,
  wherein the microstructures on the upper thermoplastic mold element are in relief with respect to the microstructure pattern on the lens.

2. The method of claim 1, wherein the casting step comprises using a thermoplastic material for said lower mold element in the second mold.

3. The method of claim 2, wherein said lower mold element is fabricated by thermoplastic injection molding.

4. The method of claim 2, wherein in the fabricating step, the upper thermoplastic mold element and the lower thermoplastic mold element are fabricated from a polymer which is one of polycarbonate, alicyclic polycarbonate copolymer, poly(methyl methacrylate), poly(methyl methacrylimide), thermoplastic polyurethane, cyclic olefin copolymer, polyarylates, polyamide, polysulfone, polyester and polyetheretherketone, or any combination thereof.

5. The method of claim 4, wherein in the fabricating step, the upper thermoplastic mold element and the lower thermoplastic mold element are both fabricated by thermoplastic injection molding from the same polymer.

6. The method of claim 1, further comprising:
  applying a multi-coat to the upper thermoplastic mold element prior to casting the lens; and
  removing the lens from the second mold such that the multi-coat is transferred to the lens.

7. The method of claim 1, further comprising, in the casting step, heating the second mold to a temperature below a glass transition temperature of the upper thermoplastic mold element to cure the monomer into the lens.

8. The method of claim 1, wherein in the fabricating step, the first mold comprises metallic inserts, at least one of which has micro-machined microstructures micro-machined thereon to form the microstructures formed in relief on the upper thermoplastic mold element.

9. The method of claim 1, wherein the microstructures are microlenses optically configured with respective focal points.

10. The method of claim 9, wherein the lens is a single vision lens for correcting myopia.

* * * * *